United States Patent [19]

Wood, Jr.

[11] Patent Number: 5,080,520

[45] Date of Patent: Jan. 14, 1992

[54] JOINT FOR RACK AND PINION STEERING ASSEMBLY

[75] Inventor: Ruey E. Wood, Jr., Harrison, Mich.

[73] Assignee: TRW Inc., Lyndhurst, Ohio

[21] Appl. No.: 648,238

[22] Filed: Jan. 31, 1991

[51] Int. Cl.⁵ .............................................. F16C 11/00
[52] U.S. Cl. ..................................... 403/77; 403/133; 403/158; 280/96
[58] Field of Search .................. 403/57, 79, 77, 76, 403/132, 133, 158, 157, 224, 225, 74; 280/96

[56] References Cited

U.S. PATENT DOCUMENTS

| | | | |
|---|---|---|---|
| 2,836,413 | 5/1958 | Hirst | 403/225 X |
| 3,030,134 | 4/1962 | Gair . | |
| 3,086,801 | 4/1963 | Herbenar . | |
| 3,693,999 | 9/1972 | Wood, Jr. | 403/133 X |
| 4,180,989 | 1/1980 | Lange | 403/57 X |
| 4,187,033 | 2/1980 | Zukowski . | |

FOREIGN PATENT DOCUMENTS 344316  3/1960  Switzerland ..................... 180/148

Primary Examiner—Andrew V. Kundrat
Attorney, Agent, or Firm—Tarolli, Sundheim & Covell

[57] ABSTRACT

A joint for a rack and pinion power steering assembly connects the rack coaxially to a tie rod. The joint comprises a socket member having a first end portion connected to the tie rod, and a second end connected to rack. The second end portion of the socket has a chamber and a pair of openings into the chamber. The openings are centered on an axis perpendicular to longitudinal axis of the tie rod. A ball member has a pair of diametrically opposed projections extending coaxially out of the openings in the socket. A connecting member connects the projections on the ball member to the rack, with the axis of the ball member perpendicular to the longitudinal axis of the rack. The rack is thus pivotal with the ball member relative to the socket and the tie rod.

7 Claims, 2 Drawing Sheets

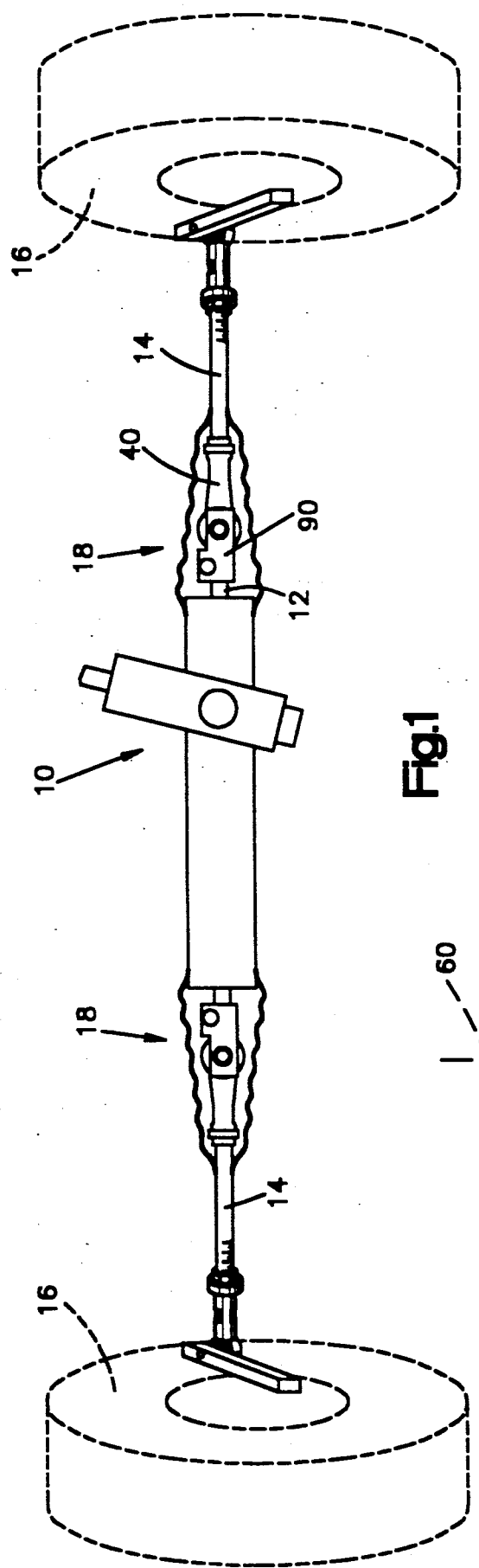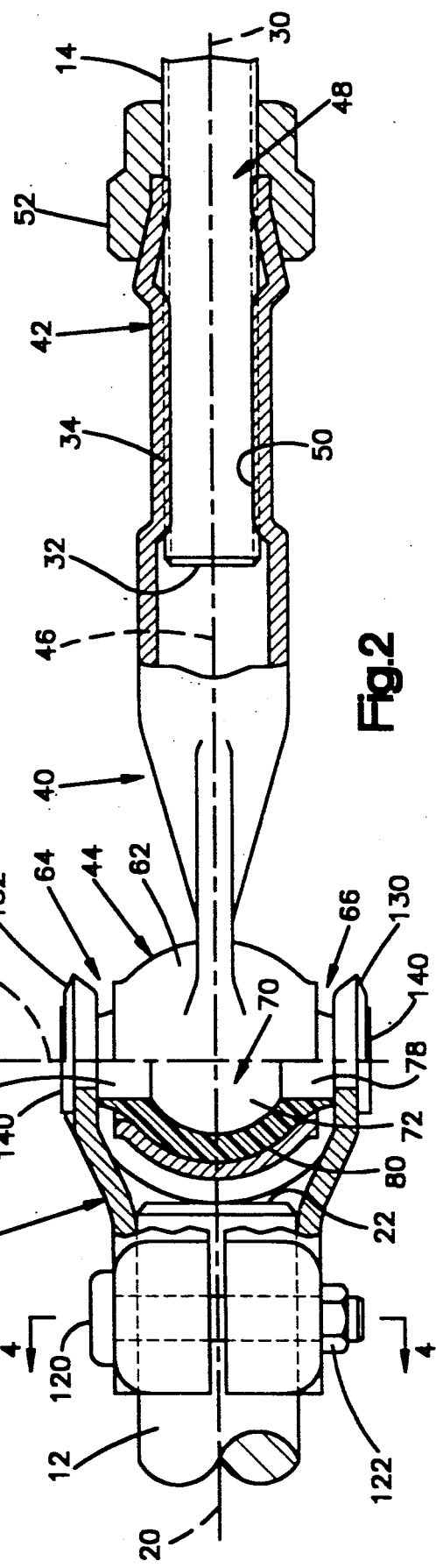

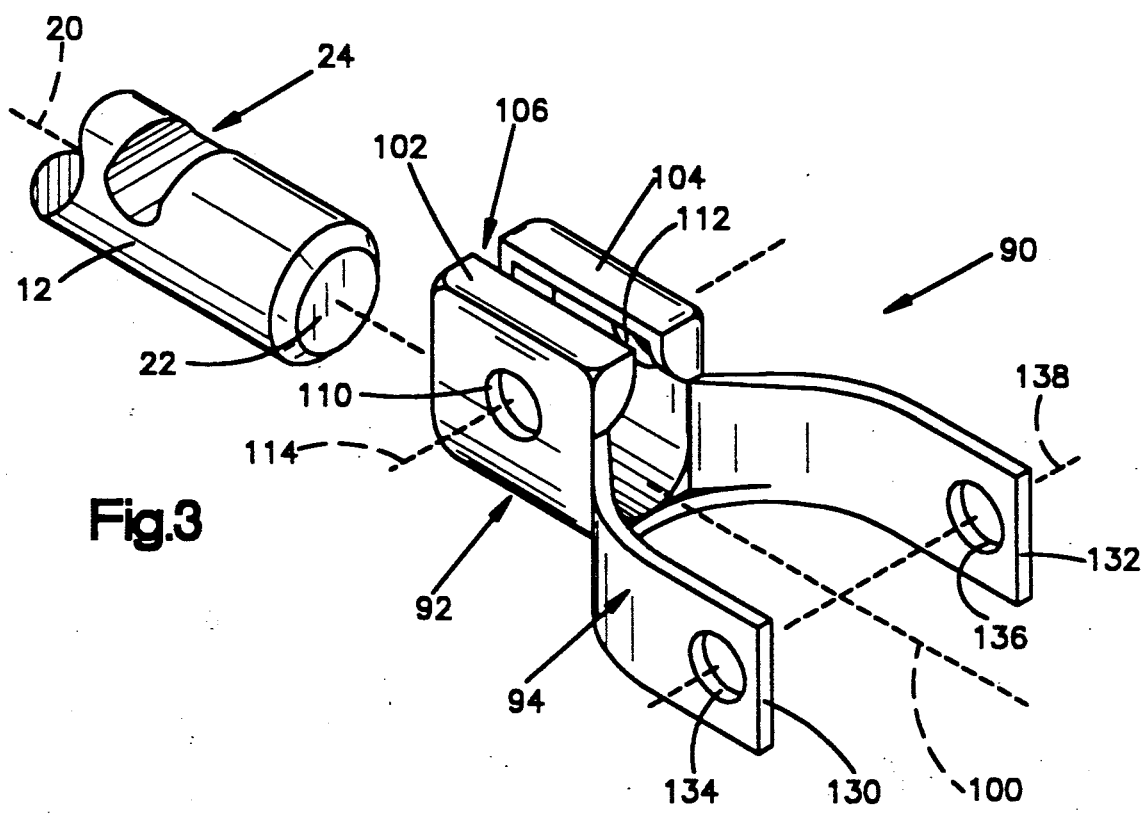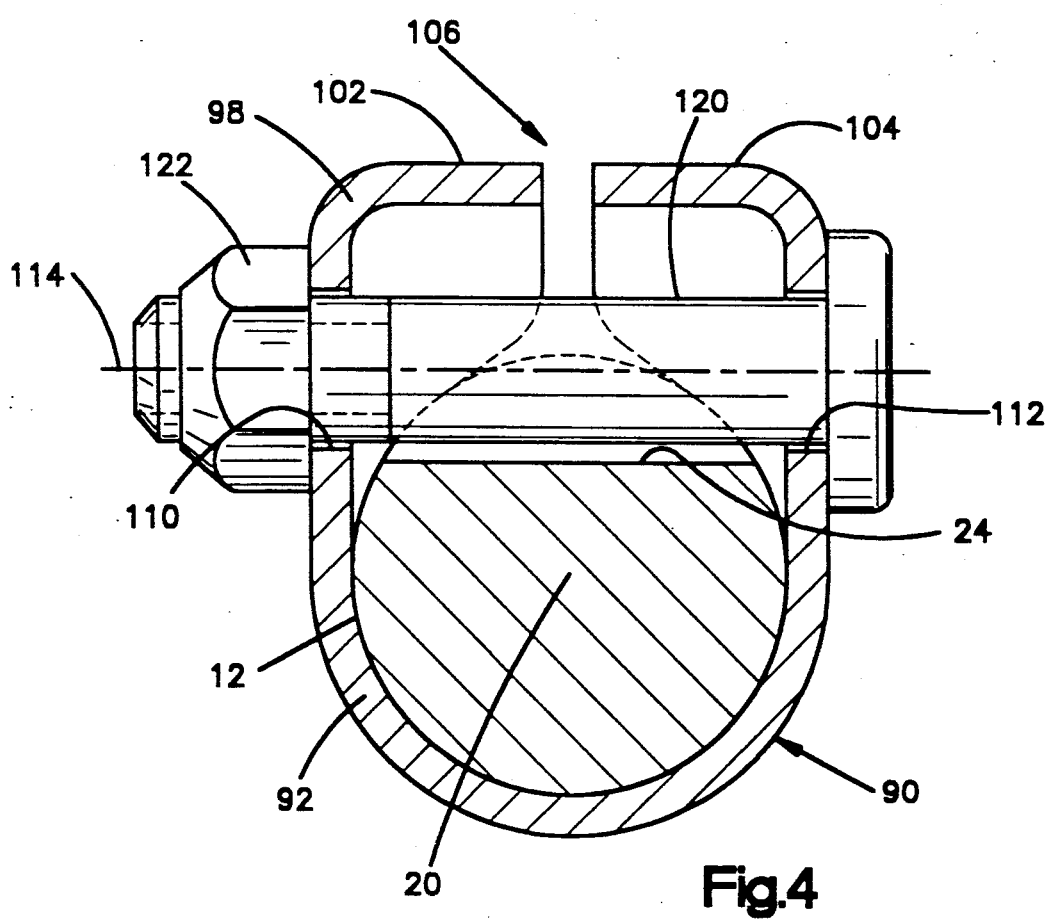

JOINT FOR RACK AND PINION STEERING ASSEMBLY

FIELD OF THE INVENTION

The present invention relates to a rack and pinion steering assembly for steering a vehicle, and particularly relates to a joint for connecting a rack to a tie rod in a rack and pinion steering assembly.

BACKGROUND OF THE INVENTION

U.S. Pat. No. 4,187,033 discloses a rack and pinion power steering assembly. The rack and pinion power steering assembly comprises an elongate rack and a pair of tie rods. The rack is moved longitudinally in a power steering gear housing, and has opposite ends extending out of the power steering gear housing. Each of the tie rods has threads at one end and a ball at the other end. The threaded ends of the tie rods are connected to respective steerable vehicle wheels. The balls at the other ends of the tie rods are connected to opposite ends of the rack by respective joints. The joints thus connect the tie rods and the rack for longitudinal movement together to effect steering movement of the steerable vehicle wheels in response to longitudinal movement of the rack.

Each joint disclosed in the '033 patent comprises a tubular housing. The housing has coaxial first and second open ends. A chamber is defined in the housing adjacent to the first open end, and a passage extends axially inward from the second open end. The ball end of a tie rod is received in the chamber, with the tie rod extending out through the first open end of the housing. An end portion of the rack extends into the passage in the housing through the second open end, and has external threads engaged with internal threads in the housing.

The ball end of the tie rod is supported for pivotal movement in the chamber relative to the housing, and the tie rod is thus movable pivotally relative to the rack. However, forces applied to the joint during longitudinal movement of the rack and the tie rod are directed primarily in an axial direction through the joint. Such forces, if large enough, can pull the ball end of the tie rod in an axial direction out of the first open end of the tubular housing.

SUMMARY OF THE INVENTION

In accordance with the present invention, a joint pivotally connects an elongate rack to a tie rod in a rack and pinion vehicle steering assembly. The joint comprises a socket which connects to the tie rod, a ball member in a chamber of the socket, a bearing for the ball member, and a connecting member which connects the ball member to the rack.

The socket has a first end portion and a second end portion. The first end portion of the socket has a first axis, and has means for connecting the first end portion coaxially with the tie rod. The second end portion of the socket defines the chamber in which the ball member is located. The chamber has a second axis perpendicular to the first axis. The socket also has a pair of openings into the chamber which are centered on the second axis.

The ball member has an axis and a pair of diametrically opposed projections extending along its axis. The bearing supports the ball member in the chamber in the socket, with the projections on the ball member extending out of the openings in the socket. The projections on the ball member are thus supported in positions perpendicular to the axis of a tie rod connected with the first end portion of the socket. The bearing supports the ball member for pivotal movement in the chamber relative to the socket and the tie rod.

The connecting member connects the projections on the ball member to the rack in the vehicle steering assembly, with the axis of the ball member being perpendicular to the axis of the rack, and with the rack being pivotal with the ball member relative to the socket and the tie rod.

The present invention provides a secure and long lasting pivotal connection between a rack and a tie rod in a vehicle steering assembly. Forces exerted on the joint between the rack and the tie rod are directed primarily coaxially between the rack and the tie rod. The projections extending from the ball member through the two openings in the socket are substantially perpendicular to the axes of the rack and the tie rod. The connecting member, which connects the projections to the rack, therefore does not urge the ball member to move in a direction outward of an opening in the socket, but instead urges the ball member to move in a direction between the two openings in the socket. The ball member and the socket are therefore not prone to separate from each other. The joint thus remains intact.

In a preferred embodiment of the present invention, the socket is a stamped steel member having internal threads for engaging external threads on the tie rod. The bearing is an elastomeric bearing which encapsulates and is bonded to the ball member. The connecting member has a base portion and a bracket portion. The base portion is radially clamped against the rack by a screw threaded fastener. The bracket portion has a pair of arms extending axially from the base portion. The arms are fixed to respective ones of the projections on the ball member.

BRIEF DESCRIPTION OF THE DRAWINGS

The foregoing and other features of the present invention will become apparent to those skilled in the art upon reading the following description of a preferred embodiment of the invention in view of the accompanying drawings, wherein:

FIG. 1 is a schematic illustration of a rack and pinion power steering assembly including joints in accordance with the present invention;

FIG. 2 is a sectional view of a joint in accordance with the present invention;

FIG. 3 is a perspective view of parts shown in FIG. 2; and

FIG. 4 is a view taken on line 4—4 of FIG. 2.

DESCRIPTION OF A PREFERRED EMBODIMENT

As shown in FIG. 1, a rack and pinion steering assembly for steering a vehicle comprises a steering gear 10. An elongate rack 12 is moved longitudinally in the steering gear 10 by a hydraulic motor (not shown) which forms a part of the steering gear 10 or manually through the pinion from an operator input. The rack and pinion steering assembly further comprises a pair of tie rods 14, each of which is connected to a respective steerable vehicle wheel 16. Each tie rod 14 is connected to an end portion of the rack 12 by a joint 18 in accordance with the present invention. The tie rods 14 are thus movable longitudinally with the rack 12 to effect steering movement of the steerable wheels 16 in response to movement of the rack 12. The two joints 18 shown in FIG. 1 at opposite ends of the rack 12 are identical. The joint 18 at the right hand end of the rack 12, as shown in FIG. 1, is shown in greater detail in FIG. 2.

As shown in FIG. 2, the joint 18 connects adjacent end portions of the rack 12 and the tie rod 14. As shown in FIGS. 2-4, the end portion of the rack 12 has a circular cross section, a longitudinal axis 20, and a circular end surface 22. A groove 24 extends transversely across the rack 12 at a location closely adjacent to the circular end surface 22 (FIG. 3). The tie rod 14 has a circular cross section, a longitudinal axis 30, and a circular end surface 32 (FIG. 2). Screw threads 34 extend axially along the tie rod 14 from the circular end surface 32.

The joint 18 comprises a stamped steel socket member 40. Preferably, the socket member 40 is formed of SAE XLF-950 steel, SAE 1010 steel, or SAE 1030 steel manufactured in a stamping or forging process and supplied by Worthington Steel Co. of Columbus, Oh. As shown in FIG. 2, the socket member 40 has a first end portion 42 and a second end portion 44. The first end portion 42 of the socket member 40 is a generally cylindrical tube and has a longitudinal axis 46, a circular opening 48 centered on the longitudinal axis 46, and screw threads 50 extending axially from the circular opening 48. The end portion of the tie rod 14 is screwed into the first end portion 42 of the socket member 40 as shown in FIG. 2. A nut 52 which is also threaded on the tie rod 14 secures the tie rod 14 and the first end portion 42 of the socket member 40 together.

The second end portion 44 of the socket member 40 has a transverse axis 60 which is perpendicular to the longitudinal axis 46, and has a substantially spherical wall portion 62 which defines a chamber centered on the transverse axis 60. The wall portion 62 also defines a pair of circular openings 64 and 66 into the chamber. The openings 64 and 66 are both centered on the transverse axis 60.

The joint 18 further comprises a ball member 70. Preferably, the ball member 70 is formed of SAE 8115 modified or SAE 8615 steel which is cold formed or machined, carburized or carbonitrided to a 20-30 Rc core hardness and a 0.006-0.015 inch case depth, and supplied by Republic Steel Corp. The ball member 70 has a substantially spherical ball portion 72 with a central axis 74. The ball member 72 also has a pair of diametrically opposed projections 76 and 78 extending from the ball portion 72 along the axis 74.

An elastomeric bearing 80 encapsulates the ball portion 72 of the ball member 70, and is bonded to the ball portion 72 and to adjacent portions of the projections 76 and 78. The bearing 80 supports the ball member 70 in an assembled position in the chamber in the socket member 40, as shown in FIG. 2. When the ball member 70 is in its assembled position, the ball portion 72 is centered on the longitudinal and transverse axes 46 and 60 of the socket member 40. The projections 76 and 78 extend out of respective ones of the openings 64 and 66 in the socket member 40, and are coaxial with the openings 64 and 66. The bearing 80 supports the ball member 70 for pivotal movement from its assembled position relative to the socket member 40 about the longitudinal and transverse axes 46 and 60 of the socket member 40. When the ball member 70 is moved relative to the socket member 40, the elastomeric bearing 80 exerts a bias against the ball member 70 urging the ball member 70 back to its assembled position as shown in FIG. 2.

Preferably, the bearing 80 is formed of natural rubber (poly-isoprene) which is Banbury mixed and insert molded by injection or transfer molding, and supplied by Yale-South Haven, Inc. of South Haven, Mich. Chemlock adhesive, supplied by Hughson Chemical Co., is preferably used in a two step adhesive coating process to form the bond between the bearing 80 and the ball member 70.

A connecting member 90 connects the projections 76 and 78 on the ball member 70 to the end portion of the rack 12. As shown in FIGS. 3 and 4, the connecting member 90 has a base portion 92 and a bracket portion 94. The base portion 92 of the connecting member 90 has an axis 100, and defines a passage in which the end portion of the rack 12 is coaxially received. The base portion 90 also has two parts 102 and 104 which are separated by an axially extending slot 106. The parts 102 and 104 have apertures 110 and 112, respectively (FIG. 4). The apertures 110 and 112 are centered on an axis 114 which is perpendicular to the axis 100. As shown in FIGS. 2 and 4, a bolt 120 extends between the parts 102 and 104 through the apertures 110 and 112, and through the groove 24 on the rack 12. The bolt 120 is secured by a nut 122 so as to clamp the base portion 92 of the connecting member 90 radially against the rack 12, and to provide a mechanical interlock with the slot 24 on the rack 12.

As shown in FIG. 3, the bracket portion 94 of the connecting member 90 comprises a pair of arms 130 and 132 extending from the base portion 92 in the direction of the axis 100. The arms 130 and 132 have apertures 134 and 136, respectively. The apertures 134 and 136 are centered on an axis 138 which is perpendicular to the axis 100 and which intersects the axis 100. The aperture 134 at the arm 130 is received coaxially over the projection 78 on the ball member 70, and the aperture 136 at the arm 132 is received coaxially over the projection 76 on the ball member 70. Rivets 140 secure the arms 130 and 132 on the connecting member 90 to the projections 76 and 78 on the ball member 70. The projections 76 and 78 could be freely pivotal in the apertures 134 and 136, but in the preferred embodiment are fixed against movement relative to the connecting member 90. Hence, all movement of tie rod 14 relative to the rack 12 is accommodated by elasticity of the bearing 80.

When the rack 12 is moved longitudinally in the steering gear 10, the tie rod 14 shown in FIG. 2 is moved longitudinally to effect steering movement of the associated steerable vehicle wheel 16 because it is connected to the rack 12 by the joint 18. During longitudinal movement of the rack 12 and the tie rod 14, forces are transmitted through the joint 18 between the rack 12 and the tie rod 14. Such forces are transmitted primarily in directions parallel to the longitudinal axes 20, 46, and 30 of the rack 12, the socket member 40, and the tie rod 14, respectively. However, since the tie rod 14 is connected to a pivotal wheel 16, and the wheel 16 is also connected to the vehicle frame or chassis through a suspension system, the tie rod 14 must also transmit and accept from the road surface forces which are not coaxial to the rack 14. Within the joint 18, forces are transmitted between the connecting member 90 and the socket member 40 through the ball member 70 and the bearing 80. Since the projections 76 and 78 on the ball member 70 extend out of the openings 64 and 66 in directions perpendicular to the longitudinal axis 46 of the socket member 40, the connecting member 90 urges the ball member 70 to move in a direction transverse to the axis 60 between the two openings 64 and 66. Neither the connecting member 90 nor the other forces acting on the joint 18 urge the ball member 70 to move in a direction outward of an opening in the socket member 40. The ball member 70 is therefore not subjected to forces tending to separate the ball member 70 from the socket member 40.

From the above description of the invention, those skilled in the art will perceive improvements, changes and modifications. Such improvements, changes and modifications within the skill of the art are intended to be covered by the appended claims.

Having described the invention, the following is claimed:

1. A vehicle steering apparatus comprising:
   an elongate rack supported for longitudinal movement, said rack having a surface portion defining a transversely extending groove;
   a tie rod supported for longitudinal movement, said tie rod being connectable to a steerable vehicle wheel to effect steering movement of the steerable vehicle wheel upon longitudinal movement of said tie rod;
   a socket member having a first end portion connected to said tie rod for movement longitudinally with said tie rod, and having a second end portion defining a chamber, said socket member further having a first axis and a second axis perpendicular to said first axis, said first end portion of said socket member having threads extending circumferentially about said first axis for engaging threads on said tie rod, said second end portion of said socket member having first and second openings into said chamber, said openings being centered on said second axis;
   a ball member in said chamber, said ball member being pivotal in said chamber relative to said socket member and said tie rod, said ball member having a pair of diametrically opposed projections extending out of said first and second openings;
   a connecting member connected to said ball member, said connecting member comprising a base and a pair of arms extending from said base, each of said arms being connected to a respective one of said projections on said ball member, said base having opposite portions adjacent to opposite ends of said groove on said rack, said opposite portions of said base being movable to clamp said base radially against said rack upon rotation of a screw threaded fastener extending in said groove between said opposite portions of said base; and
   means for securing said connecting member to said rack for said rack to be movable longitudinally with said tie rod and pivotal relative to said tie rod with said ball member, said means comprising a screw threaded fastener extending in said groove between said portions of said base and rigidly connecting said base to said rack.

2. An apparatus for connecting a rack to a threaded tie rod in a rack and pinion vehicle steering assembly, said apparatus comprising:
   a socket member having a first end portion connectable to the tie rod for movement longitudinally with the tie rod, and having a second end portion defining a chamber, said socket member further having a first axis and a second axis perpendicular to said first axis, said first end portion of said socket member having threads extending circumferentially about said first axis for engaging threads on the tie rod, said second end portion of said socket member having first and second openings into said chamber, said openings being centered on said second axis;
   a ball member in said chamber, said ball member being pivotal in said chamber relative to said socket member and the tie rod, said ball member having a pair of diametrically opposed projections extending out of said first and second openings;
   a connecting member connected to said ball member, said connecting member comprising a base and a pair of arms extending from said base, each of said arms being connected to a respective one of said projections on said ball member, said base having opposed portions movable toward each other to clamp said base radially against the rack; and
   a screw threaded fastener engageable with said opposed portions of said base to move said opposed portions of said base toward each other upon rotation of said screw threaded fastener.

3. An apparatus for connecting a rack to a threaded tie rod in a rack and pinion vehicle steering assembly, said apparatus comprising:
   a socket having a first end portion with means for connecting said socket to the tie rod, and having a second end portion defining a chamber and a pair of openings into said chamber;
   a ball member having a ball portion and a pair of diametrically opposed projections fixed to said ball portion, said ball portion being located in said chamber, said projections extending outward from said openings;
   a connecting member having a base and a pair of arms extending from said base, said base having means for connecting said connecting member to the rack, said arms being fixed to respective ones of said projections on said ball member and constraining said connecting member to move relative to said socket only with said ball member; and
   an elastomeric bearing encapsulating and bonded to said ball portion of said ball member, said bearing supporting said ball member in an assembled position relative to said socket, and said bearing exerting a bias urging said ball member to move back to said assembled position in response to all movement of said ball member relative to said socket, whereby said bearing exerts a bias resisting all movement of said connecting member relative to said socket.

4. An apparatus as defined in claim 3 wherein said first end portion of said socket has an internal thread for engaging the thread on the tie rod.

5. An apparatus as defined in claim 4 wherein said internal thread is centered on a first axis, said base having a second axis and being coaxially connectable with the rack, said base and said first end portion of said socket being coaxial when said ball member is in said assembled position.

6. An apparatus for connecting a rack to a threaded tie rod in a rack and pinion vehicle steering assembly, said apparatus comprising:
   a socket having a first end portion with an internal thread for engaging the thread on the tie rod to connect said first end portion to the tie rod, and a second end portion defining a chamber and a pair of openings into said chamber;

a ball member having a ball portion and a pair of diametrically opposed projections extending from said ball portion, said ball member having an assembled position with said ball portion in said chamber and said projections extending outward from said openings;

a bearing support said ball member in said chamber for pivotal movement relative to said socket;

a connecting member having a pair of arms and a base portion, said arms extending from said base portion and being connected to respective ones of said projections on said ball member, said base portion defining a passage in which the rack is receivable; and means for clamping said base portion against the rack when the rack is received in said passage.

7. An apparatus as defined in claim 6 wherein said internal thread is centered on a first axis, said base having a second axis and being coaxially connectable with the rack, said base and said first end portion of said socket being coaxial when said ball member is in said assembled position.

* * * * *